Aug. 18, 1970
HIROSHI KITA
3,525,015
LAMP DIMMER WITH CONDUCTION ANGLE CONTROL MEANS IN
SUPPLYING POWER TO THE LAMP LOAD
Filed June 28, 1967
5 Sheets-Sheet 1
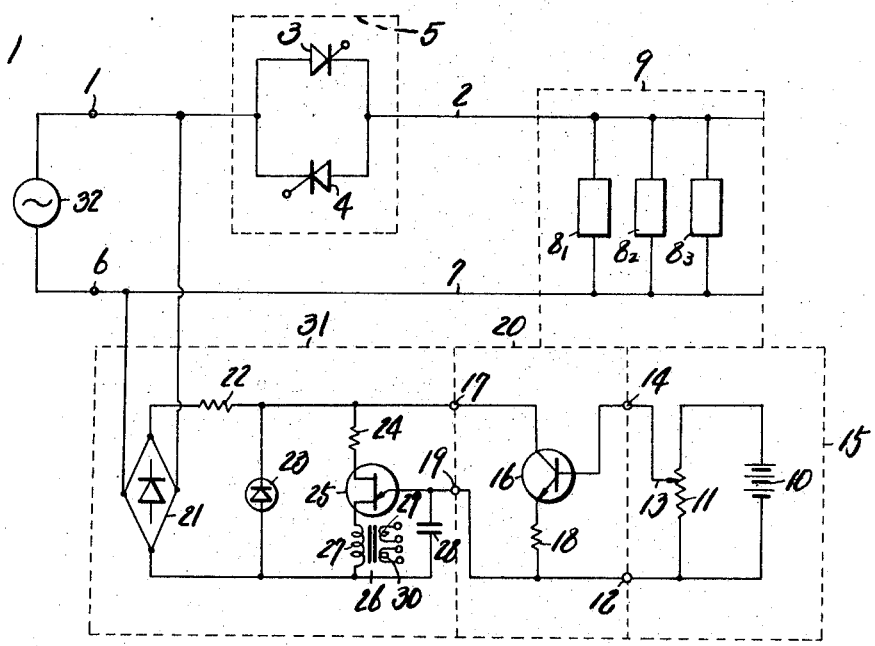
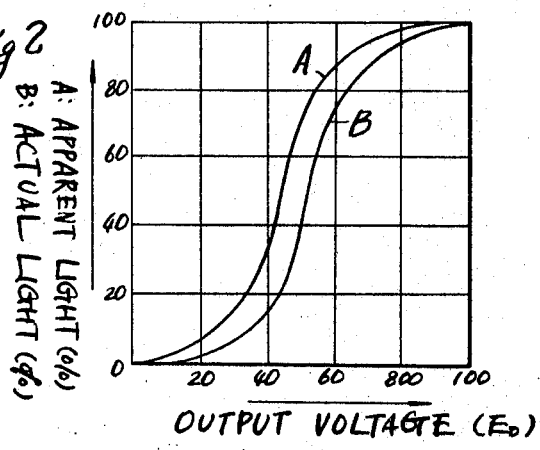
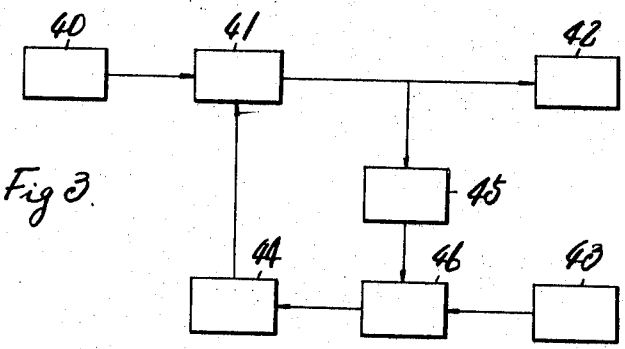
HIROSHI KITA,
INVENTOR.
BY

HIROSHI KITA,
INVENTOR.

CONDUCTION PHASE ANGLE
$\varphi_1 > \varphi_2 > \varphi_3$

Aug. 18, 1970   HIROSHI KITA   3,525,015
LAMP DIMMER WITH CONDUCTION ANGLE CONTROL MEANS IN
SUPPLYING POWER TO THE LAMP LOAD
Filed June 28, 1967   5 Sheets-Sheet 4

CONDUCTION PHASE ANGLE
$\varphi_1 > \varphi_2 > \varphi_3 > \varphi_4$

HIROSHI KITA
INVENTOR.

BY

HIROSHI KITA,
INVENTOR.

BY Hall & Houghton

United States Patent Office 3,525,015
Patented Aug. 18, 1970

---

3,525,015
LAMP DIMMER WITH CONDUCTION ANGLE CONTROL MEANS IN SUPPLYING POWER TO THE LAMP LOAD
Hiroshi Kita, Otu-shi, Japan, assignor to New Nippon Electric Company, Osaka-fu, Japan
Filed June 28, 1967, Ser. No. 649,576
Claims priority, application Japan, June 29, 1966, 41/45,230
Int. Cl. G05f 1/00; H05b 37/02
U.S. Cl. 315—194                 8 Claims

ABSTRACT OF THE DISCLOSURE

A lamp dimmer circuit having an electric valve controlling the conduction angle in supplying power to a lamp load for illumination. An AC-DC converter for a feed-back signal in correspondence with power flowing through the lamp load is connected between an amplifier and a signal generator in reverse polarity thereto. A control signal, produced by the feed-back signal and a signal from the signal generator, is applied to a pulse generator through the amplifier for controlling the conduction angle in a manner highly sensitive to momentary overload (surges of current) and voltage transients. Undesired illuminant variations caused by variations of the power supply are thereby automatically controlled.

BACKGROUND OF THE INVENTION

Field of the invention

This invention relates to a dimmer for illuminant lamps.

Description of the prior art

The prior state of the art is hereinafter described in connection with FIGS. 1 and 2 of the drawings.

SUMMARY OF THE INVENTION

The present invention relates to a circuit controlling the power supplied to the load, which effects dimming illumination of lamps by making use of a phase controlled switching circuit included thyristor means such as a silicon controlled rectifier (SCR), silicon symmetrical switch (SSS), Triac etc.

A first object of the invention is to provide an improved lamp dimmer circuit so adapted that a signal of voltage or current corresponding to a load on an illuminant source is fed back to an electric valve which controls the conduction angle of the power source so as to effectively perform the dimming operations smoothly, accurately and reliably in accord with desired characteristics. Another object is to provide a simplified lamp dimmer which is easy to handle and adapted to effect dimming in such a condition that the quantity of light from illuminant loads is controlled in accordance with any desired change characteristics.

A feature of the invention is that deviations in the light quantity of illuminant lamps are diminished irrespective of variations in source voltage, source frequency, ambient temperature and other factors.

Another feature is that the light quantity of illuminant lamps is changeable with linear relation to sensitivity of eyesight. A further feature is that substantially linear or optional characteristics are provided for changes in the light quantity by producing a minute voltage from the difference between a given signal and a feed-back signal.

BRIEF DESCRIPTION OF THE DRAWINGS

Before describing the invention in more detail there will first be given reference to the accompanying drawings.

FIG. 1 is an elementary diagram showing a circuit for a known lamp dimmer for illuminant lamps;
FIG. 2 is a graph showing the dimming characteristics of the circuit shown in FIG. 1;
FIG. 3 is an explanatory block diagram of a lamp dimmer for illuminant lamps according to the invention.

DESCRIPTION OF PREFERRED EMBODIMENTS

Figure 4:
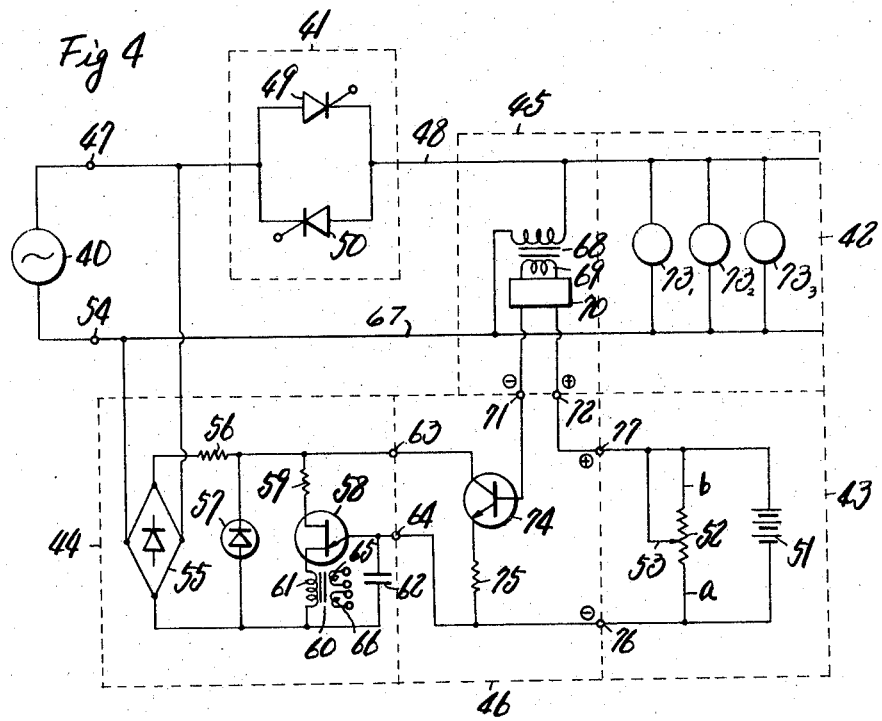
FIG. 4 is an elementary diagram showing an embodiment of the invention.

Generally, a lamp dimmer for illuminant lamps which effects conduction angle control by the use of an electric valve such as the thyristor is publicly known. For example, a typical lamp dimmer used in TV studio and theatre stages or the like is as follows. As shown in FIG. 1, a controlled rectifier means or electric valve 5 in the form of a pair of thyristor elements such as silicon rectifiers 3 and 4 connected in opposite directions is provided in series with an AC source 32 and an illuminant light load 9, and the conduction angle of the electric valve is controlled by means of a pulse signal generated by a control circuit consisting of a control signal generating circuit 15, a signal amplifying circuit 20 and a gate pulse generatng circuit 31.

The control signal generating circuit 15 constituting in part the control circuit has a closed circuit constituted by a DC source 10 and a variable resistor 11 and generates a predetermined signal voltage between a terminal 12 and a terminal 14 by operation of a slider 13 disposed on an operation panel (not shown) to vary the resistance of said variable resistor 11. The given signal is coupled at its positive polarity side with the base of a transistor 16, and at its negative polarity side with the emitter of the transistor 16 through a resistor 18.

A predetermined control signal (across terminals 17 and 19) produced by the signal amplifying circuit 20 consisting of the transistor 16 is supplied to the gate pulse generating circuit 31 of the subsequent stage.

The arrangement of the gate pulse generating circuit is as follows. The end of a resistor 22 is connected to the positive side of a full wave rectifier 21 and a voltage regulator diode 23 is interposed between the other end of the resistor 22 and the negative side of the rectifier 21. Connected in parallel with said diode is a series circuit comprising a resistor 24, the base of a unijunction transistor 25, and the primary winding 27 of a pulse transformer 26, one end of said series circuit being connected to the terminal 17 and the other end to the terminal 19 and also to the emitter of the unijunction transistor 25 through a capacitor 28. Further, the secondary windings 29 and 30 of the aforementioned pulse transformer 26 are connected to the gates and cathodes of the silicon controlled rectifiers 3 and 4, respectively, thereby producing pulses with an oscillation frequency corresponding to the output of the amplifying circuit 20, by means of which pulses the conduction angle of the electric valve 5 is controlled.

The application of the afoerementioned lamp dimmer to incandescent lamps, however, has the following disadvantages.

If the voltage of the AC-source 32 is applied to incandescent lamps 81, 82, 83, etc. in the illuminant lamp circuit 9 and the oscillation frequency of the gate pulse generating circuit 31 is changed by adjusting the slider 13 of the fader, i.e. the output signal of the amplifying circuit 20 is controlled by the given signal voltage of the signal generating circuit 15, thereby the conduction angle of the electric valve 5 including the two silicon controlled rectifiers 3 and 4 is varied substantially throughout the full 360° current cycle, and the quantity of light from the lamps is controlled effectively over the range of zero to full illumination with characteristics shown in FIG. 2, wherein relation of the signal voltage E versus the quantity of apparent light A and actual light B is illustrated. These curves are of gradual slope within the range of zero to 20% and 80 to 100% of the signal voltage E and steeply sloped within the range of 40% to 60%. This unnatural dimming results from the fact that generally, the slider of the operation panel fader is adjusted linearly. This is attributable to the fact that whereas the oscillation frequency of the gate pulse generating circuit 31, or stated differently, the conduction angle of the silicon controlled rectifiers 3 and 4 linearly changes in proportion to a change in the stroke of the slider 13 of the signal generating circuit, supplying power to the incandescent lamps, which will be controlled by the conduction angle, is charged slowly in both end portions of the stroke and greatly within the range of 20–80%, particularly 40–80% of the entire stroke because of the sinusoidal waveform of the AC source voltage. On the other hand, the quantity of light from lamps is proportional to the 3.38ths power of the applied voltage. Hence the aforementioned singular change characteristics become more pronounced. Essentially, in this kind of apparatus it is ideal that the given signal from the signal generating circuit is in linear relation with the quantity of apparent light from the incandescent lamps for human eyesight, but such characteristics are far from being expectable with the apparatus shown in FIG. 1. For this reason, it has generally been suggested to render non-linear the characteristics of the variable resistor in the signal generating circuit in order to avoid said drawbacks. However, since the fader is generally not of the single stage but in the form of a multistage fader such as master, scene and cross faders, it is almost impossible to obtain desired non-linear characteristics by combining the characteristics of these variable resistors together, and even if this were achieved it would be unavoidable for a resulting apparatus to be very much complicated.

Further, if the apparatus of FIG. 1 is used as a dimmer, e.g., for a fluorescent lamps, besides drawbacks similar to those in the case of incandescent lamps it has the following drawback.

When two groups of discharge lamps are used as sign lamps and it is desired to blink them while effecting dimming alternately in such a manner as to make constant the total amount of light from both groups of lamps, no satisfactory results could be obtained unless the change in the amount of light is smooth. Thus it is essential that the change characteristics of the amount of light from discharge lamps with respect to the given signal voltage $Eo$ be in linear relation. In such case also, the resistance characteristics of the variable resistor in the signal generating circuit has to be non-linear, and it is therefore apparent that a considerable difficulty will be involved. In short, with the apparatus shown in FIG. 1, a complicated circuit arrangement is inherently required in order to obtain any desired dimming characteristics in accord with the purposes of dimming. As a result, there are disadvantages in that a resulting apparatus is large in size and expensive.

This invention is proposed here in order to solve the aforementioned problems and comprises an electric valve placed in a feeder. An illuminant lamp circuit connected to said feeder in such a manner as to be controlled by said electric valve, a signal generating circuit for variably controlling a DC voltage, an AC–DC converter circuit for detecting the AC output of said electric valve corresponding to the light quantity of the illuminant lamps and converting it into a direct current, a differential amplifier circuit differentially interconnecting said signal generating circuit and AC–DC converter circuit, and a gate pulse generating circuit which generates a pulse of predetermined frequency according to the control signal from said amplifier circuit and controls the conduction angle of said electric valve by means of said pulse, wherein by suitably selecting constants for said AC–DC converter it is possible to allow the change characteristics of the illuminant lamps with respect to the given signal voltage of said signal generating circuit to have any desired nature.

The arrangement of the present invention will be described with reference to the drawings.

In FIG. 3, the numeral 40 denotes an AC source; 41, an electric valve; 42, an illuminant lamp circuit; 43, a signal generating circuit; 44, a gate pulse generating circuit; 45, an AC–DC converter circuit; and 46, a differential amplifier circuit.

The concrete arrangements of the above-mentioned circuits will be described in more detail with reference to FIG. 4.

Figure 5:
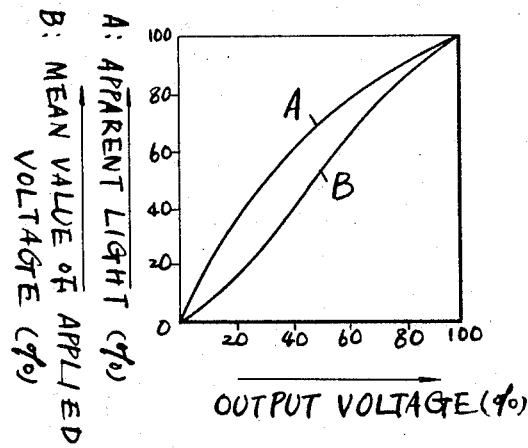
FIG. 5 is a graph showing the dimming characteristics of the circuit shown in FIG. 4.

The electric valve 41 is constituted by an inverse parallel circuit having thyristors, e.g., silicon controlled rectifiers 59 and 50 having one of their respective ends connected to a voltage source terminal 47 and the other end to a feeder 48. The signal generating circuit 43 is constituted by a DC source 51 and a variable resistor 52 which divides the voltage of said DC source, it being so arranged that a slider 53 operates in connection with the fader operating shaft. The gate pulse generating circuit 44 is constituted by a full wave rectifier 55 having its input side connected to the voltage source terminals 47 and 54, a shaping circuit consisting of a resistor 56 and a voltage regulator diode 57, and an relaxation oscillator circuit consisting of a unijunction transistor 58, a resistor 59, the primary winding 61 of a pulse transformer 60 and a capacitor 62, said relaxation oscillator circuit being connected to terminals 63 and 64. The secondary windings 65 and 66 of the pulse transformer 60 are connected to the gates and cathodes of the respective silicon controlled rectifiers 49 and 50 constituting the electric valve 41. The above-mentioned arrangements of the electric valve, signal generating circuit and gate pulse generating circuit are exactly the same as those for the conventional dimmer. The dimmer circuit of FIG. 4 is provided, in addition to these conventional arrangements, with the AC–DC converter circuit 45 and the differential amplifier circuit 46. The AC–DC converter circuit 45 is constituted by a circuit 70 consisting of a filter circuit constituted by resistors and capacitors and a full wave rectifier constituted by the secondary winding of a transformer 68 interposed between feeders 48 and 67 and rectifiers. Thus, across the output terminals 71 and 72 thereof there is obtained a DC voltage corresponding to the mean value as obtained by effecting the full wave rectification of the AC voltage to be applied to illuminant lamps $73_1$, $73_2$, $73_3$, etc. The differential amplifier circuit 46 is constituted by a transistor 74 and a resistor 75. The DC voltage obtained from the signal generating circuit 43 (hereinafter referred to as given signal voltage $Eo$) is applied to terminals 76 and 77 with the illustrated polarity, while the DC voltage obtained from the AC–DC converter circuit 45 (hereinafter referred to as feed back voltage $E_B$) is applied to terminals 71 and 72 with the illustrated polarity. After all, it is so arranged that the base current of the transistor 74 dependent on the difference of the two output voltages Eo and E$_B$ is amplified. On the supposition that the illuminant lamps 73$_1$, 73$_2$, 73$_3$, etc. in the circuit of FIG. 4 are incandescent lamps, the manner of operation thereof will now be explained. When a voltage is developed across the terminals 76 and 77 by suitably adjusting the variable resistor 52 in the signal generating circuit 43, the gate pulse generating circuit 44 is actuated through the differential amplifier circuit 46 to determine the conduction angle of the silicon controlled rectifiers 49 and 50, whereby power is supplied to the incandescent lamps 73$_1$, 73$_2$, 73$_3$, etc. to light the latter. On the other hand, the AC voltage to be applied to the incandescent lamps, i.e., the output from the electric valve 41, is rectified by the AC–DC converter circuit 45 to provide an output having the mean value thereof which, in turn, is fed back to the differential amplifier circuit 46. Therefore, if the amplification factor of the differential amplifier circuit 46 is adequately high, then the given signal voltage Eo>the feed back voltage E$_B$ and the apparatus will operate in such a way as to meet the condition that the given signal voltage Eo=the feed back voltage E$_B$. Unlike the conventional dimmer system herein the conduction angle of the electric valve is linearly changed in proportion to the stroke of the slider in the signal generating circuit, the result of the present system is that the rate of change of the conduction angle is relatively high in the initial part of the stroke (when the instantaneous valve of the source voltage corresponding to initiation of conduction is small) and low within the range of 20–80% of the entire stroke and above this limit it becomes greatly increased. Therefore, with the apparatus of this embodiment, it is possible to allow the characteristics of the output voltage and apparent light to further approach straight lines. Thus, in FIG. 5, the horizontal axis represents the output voltage, which corresponds to the mean value voltage as obtained by effecting the full wave rectification of the voltage to be applied to the incandescent lamps. The relation between this voltage and the effective value of the voltage to be applied to the incandescent lamps is as demonstrated by a curve A and the relation between it and the apparent light is as indicated by a curve B, it being clear that the curve B resembles a straight line. This is accounted for by the fact that the relation between the actual light $\phi$ from the incandescent lamp and the applied voltage V is given by $$\phi \propto V^{3.38}$$

and the relation between the actual light $\phi$ and apparent light $\phi'$ is given by $$\phi' \propto \sqrt{\phi} \therefore \phi' \propto 1.69$$

While the above embodiment has been described with reference to a particular case in which incandescent lamps are used as the illuminant lamps, the same apparatus may be applied to tungsten iodine lamps, since the equation $\phi \propto V^{3.38}$ is substantially satisfied in the latter case. Further, similar results will be obtained for other types of illuminant lamps by suitably setting input-output characteristics for the AC–DC converter circuit. Thus, by the apparent light is meant that magnitude of brilliance of an illuminant lamp which is sensed by the eye when we see the lamp. In principle, it would be necessary to detect the intensity of incident light sensorially or in terms of eyesight to produce a corresponding electric signal. However, it is most difficult in practice to obtain such kind of output, in place thereof use is made of the applied voltage on an illuminant lamp whose applied voltage versus apparent light characteristics are previously known. It is therefore necessary to so design the input-output characteristics of an AC–DC converter that they may be analogous to the applied voltage versus apparent light characteristics of the particular illuminant lamp. To this end, selection is made of rectifier systems of a suitable combination of non-linear elements is used, whereby any desired characteristics can be easily obtained.

Further, the present invention presents an additional advantage in that even if variations in source voltage occur, these are automatically compensated. For example, referring to the conventional apparatus shown in FIG. 1, considering an instance in which the source voltage rises when the illuminant lamps are in a certain condition, the oscillation frequency of the gate pulse generating circuit would remain unchanged under action of the voltage regulator diode and hence the conduction angle of the silicon controlled rectifiers would not be changed at all, so that the output voltage thereof increases with increasing source voltage and, after all, the brilliance of the illuminant lamps increases. In contrast, according to the circuit system shown in FIG. 4, since a DC voltage which responds to an increase in the output voltage of the silicon controlled rectifiers 49 and 50 is applied to the differential amplifier circuit 46 with the polarity reversed from the bias on the transistor 74, the oscillation frequency of the gate pulse generating circuit 44 would be decreased to decrease the conduction angle of the silicon controlled rectifiers 49 and 50, thereby to destroy the increase of the source voltage. In case that the source voltage drops, the process is the reverse from the above, the conduction angle of the silicon controlled rectifiers being then increased. In either case, the brilliance of the illuminant lamps is thus kept constant.

Figure 6:
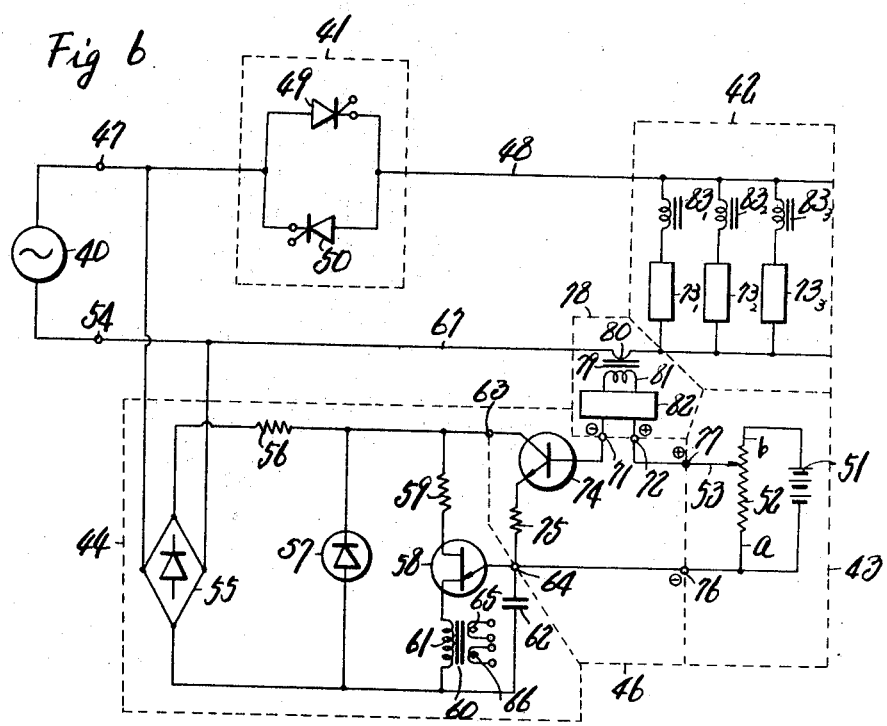
FIG. 6 is an elementary diagram showing another embodiment of the invention.
Figure 7:
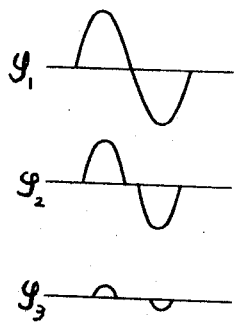
FIG. 7 is a view showing the wave forms of load currents according to the lamp dimmer shown in FIG. 6.

FIG. 6 illustrates a dimmer for discharge lamps wherein an AC–DC converter circuit 78 is provided for detecting the feeder load current in the electric circuit shown in FIG. 1 and converting it into a direct current, and the signal generating circuit and said AC–DC converter circuit are differentially interconnected, thereby providing substantially linear characteristics with changes in the amount of light from the discharge lamps with respect to the signal generating circuit. Thus, placed in a feeder 67 connected to a voltage source terminal 54 is an element, e.g. the primary winding 80 of a current transformer 79, for detecting the current flowing through said feeder, the secondary winding 81 of said current transformer 79 being connected to the input side of a rectifier means 82 having the output side thereof connected to terminals 71 and 72, thereby constituting the above-mentioned AC–DC converter circuit 78. Essentially, the circuit shown in FIG. 6 has the same arrangement as the circuit shown in FIG. 4, except for the arrangement of the AC–DC converter circuit, like reference numerals indicating like parts in the circuits of FIGS. 4 and 6. It is noted, however, that discharge lamps are used as the illuminant lamps in the illuminant lamp circuit and choke coils 83$_1$, 83$_2$, 83$_3$, etc. are connected to the respective discharge lamps. Further, the signal generating circuit 43 is so designed that the slider 53 of the variable resistor 52 may be shifted from point $a$ to point $b$ to change the given signal voltage Eo across the terminals 76 and 77 within the range of 0–100% thereby to effect 0–100% dimming of the discharge lamps. The design of the AC–DC converter circuit 78 is such that the feed back voltage E$_B$ of said circuit is always lower than the given signal voltage Eo by a minute voltage $\Delta$E.

Now, in the above-mentioned circuit if the slider 53 of the variable resistor 52 in the signal generating circuit 43 is set at a suitable position between the points $a$ and $b$ and the AC voltage source 40 is connected across the terminals 47 and 54, the electric valve 41 is rendered conductive by the pulses controlled by the given signal voltage Eo so that the discharge lamps are lit. The feed back voltage E$_B$ which is in proportional relation to the load current is applied to the terminals 71 and 72 and the light quantity of the discharge lamps is stabilized at a point where the difference between the given signal voltages E$_B$ and Eo equals the minute voltage $\Delta$E. If the slider is further moved toward the point $b$, the given signal voltage $Eo$ across the terminals 76 and 77 rises to increase the minute voltage difference $E$ between the voltages $Eo$ and $E_B$, with the result that a collector current controlled by said differential voltage flow through the collector circuit of the transistor 74 to charge the capacitor 62 until the terminal voltage of said capacitor reaches the peak voltage value of the unijunction transistor 58 to render the first base-emitter region conductive, whereupon the capacitor 62 is discharged through the primary winding 61 of the pulse transformer 60, so that a pulse is induced in the secondary windings 65 and 66, but since the differential voltage is higher now than it was at stability, the oscillation frequency of the pulse becomes higher to consequently increase the conduction angle to increase the light quantity of the discharge lamps along with load current, the light quantity being stabilized at a point where the difference between the voltages $Eo$ and $E_B$ equals the minute voltage $\Delta E$.

Figure 12:
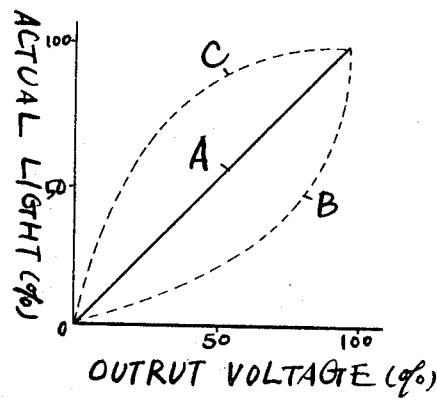
FIG. 12 is a graph showing the dimming characteristics of the lamp dimmers for illuminant lamps shown in FIGS. 6, 8 and 11.

In this way, the circuit of FIG. 6 functions so that the frequency of the pulse may change with the change of the difference between the voltages $Eo$ and $E_B$ and said voltage difference may reach the minute voltage $\Delta E$, thus making it possible to allow the light quantity of the discharge lamps to be substantially proportional to the given signal voltage $Eo$. That is, the two voltages can be expressed by the relation $$Eo - E_B = \Delta E$$

where $Eo > E_B \propto$ light quantity of discharge lamps. Therefore, the smaller the $\Delta E$, the more linearly the light quantity of the discharge lamps can be changed within the range of the change of the given signal voltage $Eo$, as shown in FIG. 12 and, what is more, the circuit design becomes extremely easy. In addition, the explanation has been made to the effect that whenever the difference of voltage between the voltages $Eo$ and $E_B$ as $Eo$ changes reaches the $\Delta E$, the light quantity is stabilized. To be precise, however, it changes with the change of the output voltage in the following manner:

$$\Delta E_{100} > \Delta E_{80} > \Delta E_{60} > \ldots$$

wherein the suffix to $\Delta E$ indicates the percentage of the given signal voltage $Eo$.

Therefore, the circuit of FIG. 6 also functions to stabilize the light quantity of the discharge lamps so that in case that the source voltage drops, the feed back voltage $E_B$ drops attending the decrease of the load current to increase the difference between the voltages $Eo$ and $E_B$, but when said difference of voltage becomes greater than the $\Delta E$, the frequency of the pulse becomes higher to increase the conduction angle of the electric valve, thus increasing the feed back voltage $E_B$ along with the load current until the difference of voltage reaches the $\Delta E$, thereby to correct the light quantity of the discharge lamps so that it may attain a value determined by the set value for the given signal voltage $Eo$, whereby it is possible to maintain a fixed light quantity. Further, even if ambient temperature changes to cause a change in the load current, there occurs no trouble to operation, since the circuit functions to keep the light quantity of the discharge lamps constant, as mentioned above. Further, in case that two groups of discharge lamps are used as sign lamps and it is desired to blink them while dimming them alternately, satisfactory results can be obtained since the light quantity changes linearly as contrasted with the conventional apparatus. Moreover, the present system is not limited to such special use, but it is applicable to theatre, TV studios, etc., with satisfactory results of dimming assured.

Figure 8:
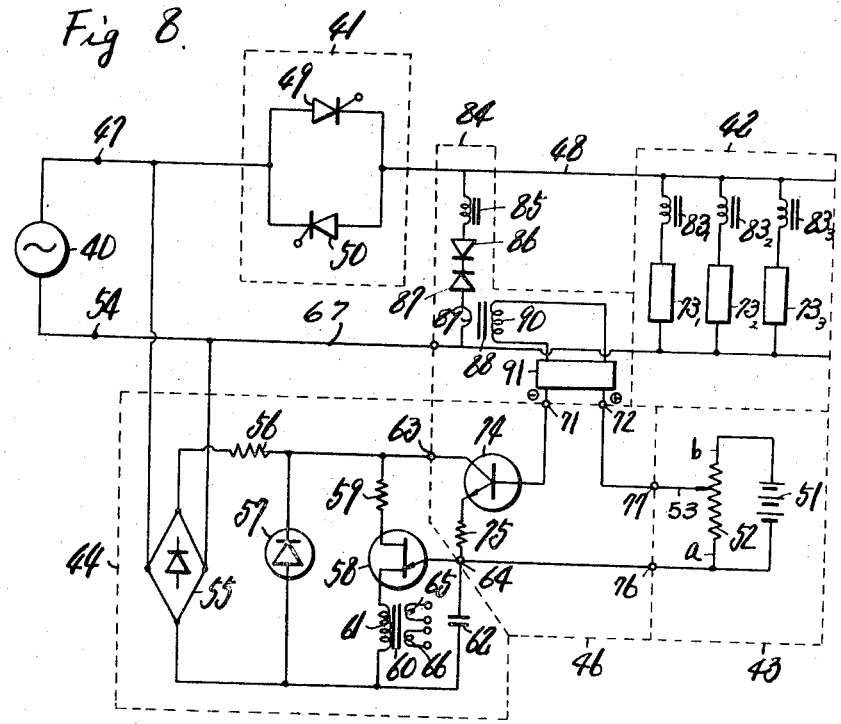
FIG. 8 is an elementary diagram showing a circuit arrangement for still another embodiment of the invention.
Figure 9:
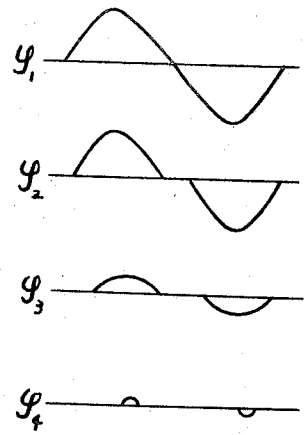
FIG. 9 is a view showing the wave forms of currents according to the lamp dimmer shown in FIG. 8.

A dimmer for discharge lamps shown in FIG. 8 is arranged in such a manner that in the electric circuit shown in FIG. 1 a reference circuit 84 for the illuminant lamp circuit including inductive reactance is connected in parallel with the illuminant lamp circuit; a DC–AC converter circuit for detecting the reference current and converting it into a direct current is connected to said reference circuit; and in the above-mentioned differential amplifier circuit 46, the above-mentioned signal generating circuit and the AC–DC converter circuit are differentially connected, so that by suitably selecting a constant for each of the components of the reference circuit 84 it is made possible to freely select change characteristics for the light quantity of the discharge lamps relative to the given signal voltage of the signal generating circuit 43. The reference circuit 84 is constituted by a series circuit connected between feeders 48 and 67 and comprising an induction reactance, e.g. a choke coil 85, and inverse series-connected voltage regulator diodes 86 and 87. An element for detecting the reference current, e.g. the primary winding 89 of a current transformer 88, is placed in the reference circuit 84. Further, the AC–DC converter circuit for converting the reference current into a direct current is constituted by connecting the secondary winding 90 of the current transformer 88 to the input side of a rectifier means 91 and connecting the output side of said rectifier means 91 to terminals 71 and 72. Essentially, the circuit of the FIG. 8 differs from the circuit arrangement by FIG. 4 only in reference circuit arrangement, the other circuit arrangements being the same as those of FIG. 4, like reference numerals indicating like parts.

Figure 10:
FIG. 10 is a view showing the wave form of the terminal voltage across a voltage regulator element used in the embodiment of the invention shown in FIG. 8.

Now, in the circuit of FIG. 8 if a choke coil having substantially the same characteristics as the choke coils $83_1$, $83_2$, $83_3$, etc., in the illuminant lamp circuit 42 are used as the choke coil 85 and the voltage across the diodes 86 and 87 exhibiting substantially the same wave form as the tube voltage wave form of the discharge lamps as shown in FIG. 10 is made substantially the same as the tube voltage, the voltage-current characteristics of the reference circuit 84 becomes substantially the same as those of the discharge lamp circuit 42, so that the reference currance and hence the feed back voltage $E_B$ and the light quantity of the discharge lamps exhibit linear relation, and the subsequent operation, which is similar to that of the discharge lamp dimmer circuit shown in FIG. 6, makes it possible to change the light quantity of the discharge lamps linearly with respect to the change of the voltage $E_B$ and hence $Eo$.

Choke coils for discharge lamps are generally so designed as to exhibit some degree of saturation characteristics. Thus if in the circuit of FIG. 8 the choke coil 85 is so designed as not to have any saturation characteristics, then the relation between the discharge lamp current and the reference current will no longer be the same as in the above-mentioned embodiment, thus exhibiting a curve relation. And if the extent is selected it follows that the discharge lamp current increases or decreases in proportion to the second power of the reference current. Thus, since the discharge lamp current and light quantity of the discharge lamps, and also the reference current and feed back voltage $E_B$ have respectively linear ratios, the net result is that the light quantity of the discharge lamps increases or decreases in proportion to the second power of the feed back voltage $E_B$. If it is so designed that the feed back voltage becomes substantially the same as the given signal voltage $Eo$ as in the case of the above-mentioned embodiment, the light quantity of the discharge lamps will change approximately in proportion to the second power of the given signal voltage $Eo$ as shown by a line B in FIG. 12, for example, so that the apparent light becomes substantially linear, resembling the ideal characteristics. Further, if the choke coil 85 in the reference circuit 84 is so designed as to have suitable saturation characteristics, the light quantity of the discharge lamps changes relative to the given signal voltage $Eo$ in the manner indicated by a curve C in FIG. 12. Therefore, by changing the characteristics of any component of the reference circuit 84, e.g. the choke coil 85, it is possible to select the relation between the given signal voltage $Eo$ and the light quantity of the discharge lamps in any desired manner within the range of B through C in FIG. 12.

Figure 11:
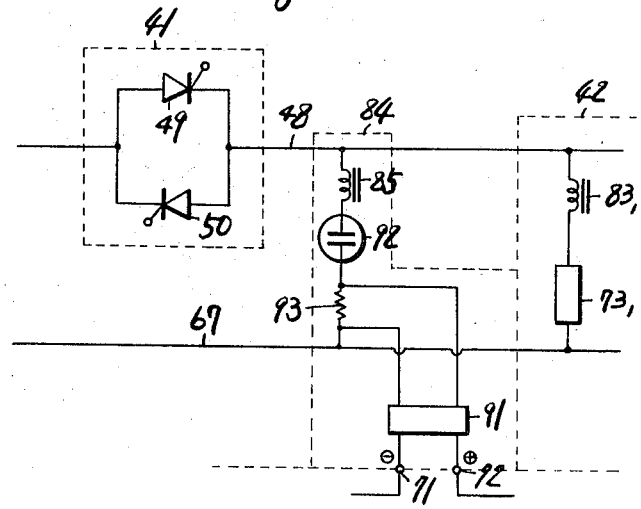
FIG. 11 is an elementary diagram showing the principal portion of a circuit, a modification of the dimmer shown in FIG. 8.

A circuit shown in FIG. 11 is a modification of the circuit shown in FIG. 8, wherein the voltage regulator diode is replaced by a small-sized discharge tube 92 and the current transformer by a resistor 93. In this case also, effects similar to those obtained by the circuit arrangement of FIG. 8 are obtainable. The other circuit arrangements are the same as in FIG. 8 and are therefore not illustrated.

Essentially, the apparatus of the present invention works so as to maintain a fixed amount of light against variations in source voltage, source frequency, ambient temperature and other accidental factors, thus providing excellent characteristics. For example, in case that source voltage rises, the feed back voltage $E_B$ increases along with the reference current thereby to increase the difference between the voltages $E_B$ and $Eo$ in reverse polarity relation, so that the oscillation frequency of the pulse is decreased to regulate the conduction angle so as to decrease the reference current along with the discharge lamp current to quickly adjust the difference between the voltages $E_B$ and $Eo$ to the $\Delta E$, so that practically there can be seen no change in the light quantity. Further, against a source voltage drop, a fixed light quantity is maintained through similar operative procedures. As the present apparatus assures a feature of fixed light quantity against variations in source voltage, source frequency, etc., there is no need of providing means for compensation of the causes of such variations and hence it is clear that economy in this respect is further improved.

What is claimed is:

1. Apparatus for variably controlling the supply of current from an AC source (40) to an illumination load (42) comprising, in combination:
    (a) a feed input (47, 54) for connection to said AC source,
    (b) a feed output (to 42) for connection to said illumination load,
    (c) a feed circuit (48, 67) connecting said feed input and feed output,
    (d) solid state control means (41) connected in said feed circuit for controlling the passage of alternating current from said input (47, 54) to said output (to 42),
    (e) a gate pulse generator (44) connected to said solid state control means for controlling the conduction angle of said solid state control means in accordance with the oscillation frequency of the generated pulse,
    (f) given signal generating means (43) for producing at its output (76, 77) a DC control signal voltage ($Eo$) to vary the illuminant intensity of said illumination load (42),
    (g) AC–DC converting means (45, 78 or 84) connected to said circuit (48, 67) for producing at its output (71, 72) a DC feed back voltage ($E_B$) proportional to the AC output of said solid state control means,
    (h) a mixing circuit connected with reverse polarity to the outputs (71, 72, 77, 76) of said given signal generator and said AC–DC converting means for differentially connecting the voltages ($E_B$ and $Eo$) produced thereat to obtain at its output a minute voltage ($\Delta E$) varying as the difference therebetween, and
    (i) an amplifier connected to said mixing circuit and to said gate pulse generator and having an active element (74, 75) for amplifying the output voltage of said mixing circuit and applying the resulting signal to said gate pulse generating means for determining the oscillation frequency thereof.

2. Apparatus according to claim 1 particularly adapted for controlling the supply of current to an incandescent lamp illumination load, wherein
    (j) said AC–DC converting means (g) has a rectifier-filter circuit (70) connected to its output (71, 72) and a transformer (68) with its primary connected to said feed circuit (48, 67) in parallel with said feed output (to 42), and its secondary (69) connected to said rectifier-filter circuit, for producing at its output (71, 72) a DC feed back voltage corresponding linearly to the mean value of the AC voltage applied to said feed output (to 42).

3. Apparatus according to claim 1, particularly adapted for controlling the supply of current to an illuminant discharge lamp load, wherein
    (j) said AC–DC converting means (g) comprises a rectifier circuit (82) connected to its output (71, 72) and detecting means (79) connected in series with said feed circuit (48–67) and to said rectifier circuit for deriving from the AC current flowing in said feed circuit a feed back signal and rectifying the same for delivery to its output (71, 72) as said DC feed back voltage ($E_B$).

4. Apparatus according to claim 1, particularly adapted for controlling the supply of current to an illuminant discharge lamp load, wherein
    (j) said apparatus has connected to said feed circuit (48, 67) an artificial load circuit (85, 86) having at least one inductive reactance element (85), and
    (k) said AC–DC converting means (g) comprises means (88, 91) electrically connected to said artificial circuit for deriving a feed back signal from the AC current flowing therein and for rectifying the same for delivery to its output (71, 72) as said DC feed back voltage ($E_B$).

5. Apparatus as set forth in claim 4 wherein the inductive reactance element of said artificial circuit is selected to have substantially the same characteristics as those of said illuminant discharge lamp load, so that the actual light quantity of the illuminant discharge lamp load may be varied linearly with respect to change of the DC control signal voltage produced by said given signal generating means (43).

6. Apparatus as set forth in claim 4 wherein the inductive reactance element of said artificial circuit is selected to have substantially an unsaturation characteristic in contrast with those having saturation characteristics of said illuminant discharge lamp load, so that the apparent light quantity of the illuminant discharge lamp load may be varied linearly with respect to change of the DC control signal voltage produced by said given signal generating means (43).

7. Apparatus as set forth in claim 4, wherein the inductive reactance element of said artificial circuit is selected to have a sharper saturation characteristic than those of said illuminant discharge lamp load, so that the apparent light quantity of the illuminant discharge lamp load may be varied more smoothly in the upper range with respect to increase of the DC control signal voltage produced by said given signal generating means (43).

8. Apparatus as set forth in claim 4, wherein said artificial circuit (j) has at least one inductance (85) and a series resistor (93) and the electrical connection referred to in clause (k) is made across said series resistor (93).

References Cited

UNITED STATES PATENTS

| 3,335,318 | 8/1967 | Yancey | 315—194 |
| 3,397,344 | 8/1968 | Skirpan | 315—194 |
| 3,419,753 | 12/1968 | Schultz et al. | 315—194 |

JOHN W. HUCKERT, Primary Examiner

B. ESTRIN, Assistant Examiner

U.S. Cl. X.R.

315—199, 137, 140, 145, 147